Nov. 26, 1957 R. ADLER ET AL 2,814,671

NOISE PULSE INTERRUPTION OF SYNCHRONIZING SIGNAL SEPARATOR

Filed June 8, 1951 4 Sheets-Sheet 1

INVENTORS
ROBERT ADLER
MEYER MARKS
BY Francis W. Crotty
THEIR ATTORNEY.

INVENTORS
ROBERT ADLER
MEYER MARKS
BY Francis W. Crotty
THEIR ATTORNEY.

NOISE PULSE INTERRUPTION OF SYNCHRONIZING SIGNAL SEPARATOR

Filed June 8, 1951

4 Sheets-Sheet 3

INVENTORS
ROBERT ADLER
MEYER MARKS
BY Francis W. Crotty
THEIR ATTORNEY.

NOISE PULSE INTERRUPTION OF SYNCHRONIZING SIGNAL SEPARATOR

Filed June 8, 1951 4 Sheets-Sheet 4

INVENTORS
ROBERT ADLER
MEYER MARKS
BY Francis W. Crotty
THEIR ATTORNEY.

United States Patent Office 2,814,671
Patented Nov. 26, 1957

2,814,671

NOISE PULSE INTERRUPTION OF SYNCHRONIZING SIGNAL SEPARATOR

Robert Adler, Northfield, and Meyer Marks, Clarendon Hills, Ill., assignors to Zenith Radio Corporation, a corporation of Illinois Application June 8, 1951, Serial No. 230,472

5 Claims. (Cl. 178—7.3)

This invention relates to television receiver synchronizing systems and more particularly to systems providing greatly improved noise immunity as compared with previously known synchronizing systems.

In accordance with presently accepted practice, television transmission is effected by means of composite video signals having video-signal components of a predetermined maximum amplitude and synchronizing-pulse components of an amplitude greater than the maximum video-signal amplitude. In order to provide faithful reproduction of the transmitted picture information, special circuits are provided at the receiver for extracting the synchronizing-pulse components from the received composite video signals, and the separated synchronizing-signal pulses are employed to drive line-frequency and field-frequency deflection systems associated with the image-reproducing device to maintain the scanning operation at the receiver in synchronism with that at the transmitter. In an ideal communication system, in which the received signal comprises only the desired information-bearing signal components, no difficulty would be encountered in maintaining the receiver in synchronism with the transmitter. In practice, however, particularly in the case of modulated carrier transmission and reception, the incoming composite video signals are often subject to extraneous noise pulses which lead to impaired operation at the receiver. These extraneous noise pulses are generally of very short duration but of much greater amplitude than the synchronizing-signal pulse components of the composite video signals, with the result that noise pulses occurring during video-signal intervals and translated to the signal-input circuit of the image-reproducing device cause black spots or streaks to appear in the reproduced image. Of far greater significance, however, the extraneous noise pulses are also applied to the synchronizing system. At best, this results in extraneous randomly occurring pulses in the output of the synchronizing-signal separator. To avoid false synchronization or complete loss of synchronization as a result of these extraneous noise-pulse components, it is conventional practice to employ an automatic frequency control arrangement in the line-frequency scanning system. Automatic frequency control has not generally been employed, however, in connection with the field-frequency scanning system.

In practice, it is customary to employ a self-biasing input circuit for the synchronizing-signal separator in order to insure automatic variation of the clipping level in response to changes in the average amplitude of the incoming composite video signals. When a self-biased synchronizing-signal separator is employed, the effect of extraneous noise pulses on receiver synchronization may be much more deleterious. Since the noise pulses are generally of much greater amplitude than any desired component of the composite video signals, the negative grid bias of the separator tube is sharply increased, and the grid bias is not restored to normal for a substantial period of time following the termination of the noise pulse, depending on the discharge time constant of the self-biasing input circuit. Consequently, a single noise pulse may paralyze the synchronizing-signal separator for several line-scanning intervals, during which time the scanning system may drift out of synchronism. This effect is somewhat counteracted in the line-frequency scanning system by the use of automatic frequency control, but no provision is customarily made for combatting asynchronous drift of the field-frequency scanning system which may be caused by noise paralysis of the synchronizing-signal separator.

Numerous arrangement in addition to automatic frequency control have been proposed for counteracting the undesirable effects of extraneous noise pulses. Some of these arrangements include the provision of special balancing circuits for effectively removing the extraneous noise components from the received signal. Others employ gating arrangements for controlling the transmitting efficiency of the signal-translating channel for the duration of the undesired noise pulses. Still others employ a separate stage for limiting or clipping the undesired noise pulses from the received signal. All of the systems which have been proposed, however, require special circuitry of a more or less complex nature and usually involve the use of at least one auxiliary diode or electron-discharge device which performs no function other than that of noise suppression or compensation.

It is a primary object of the present invention to provide a new and improved noise suppression system, particularly useful in the synchronizing system of a television receiver or the like, in which substantial noise immunity is achieved without the use of auxiliary diodes or electron-discharge devices.

It is a further object of the invention to provide a new and improved synchronizing-signal separator, for use in a television receiver or the like, which is substantially immune to undesired paralysis effects attributable to extraneous noise pulses.

Still another object of the invention is to provide a new and improved noise-immune synchronizing-signal separator in which noise immunity and synchronizing-signal separation are accomplished by means of a single electron-discharge device.

In accordance with one feature of the invention, an improved television receiver synchronizing system comprises a source of composite video signals of one polarity. Phase-inverting means are coupled to the composite video signal source for developing similar composite video signals of the opposite polarity. The composite video signal source and the phase-inverting means are coupled to separate control grids of an electron-discharge device which also comprises an electron-emission cathode and an output electrode. One of the coupling means consists of linear circuit elements, and the other comprises a series condenser and a shunt resistor. An output circuit is coupled to the output electrode and to the cathode.

In accordance with another feature of the invention, a multigrid electron-discharge device is employed as a synchronizing-signal separator in a television receiver. Positive-polarity composite video signals are applied through a self-biasing network between the second control grid and the cathode of the separator tube, while negative-polarity noise pulses are effectively applied between the first control grid and the cathode to provide noise gating and to prevent noise components applied to the second control grid from affecting its bias.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Throughout the specification and the appended claims, the term "composite television signal" is employed to describe the received modulated carrier signal, while the term "composite video signal" is used to denote the varying unidirectional signal after detection. The polarity of a composite video signal is determined by referring the synchronizing-pulse components to the video-signal components; thus, a "positive-polarity" composite video signal is one in which the synchronizing-signal pulses are positively oriented with respect to the video-signal components, while a "negative-polarity" composite video signal is one in which the synchronizing-pulse components are negatively oriented with respect to the picture information. The polarity of the composite video signal applied to the input circuit associated with a control grid is reckoned from the control grid to the cathode; for this purpose, the polarity is determined by considering the signal potential at the control grid with respect to cathode potential as a reference, regardless of whether grid-feed or cathode-feed is employed. "Counterphased composite video signals" are similar composite video signals of opposite polarity, i. e., composite video signals differing in phase by 180 degrees.

Figure 1:
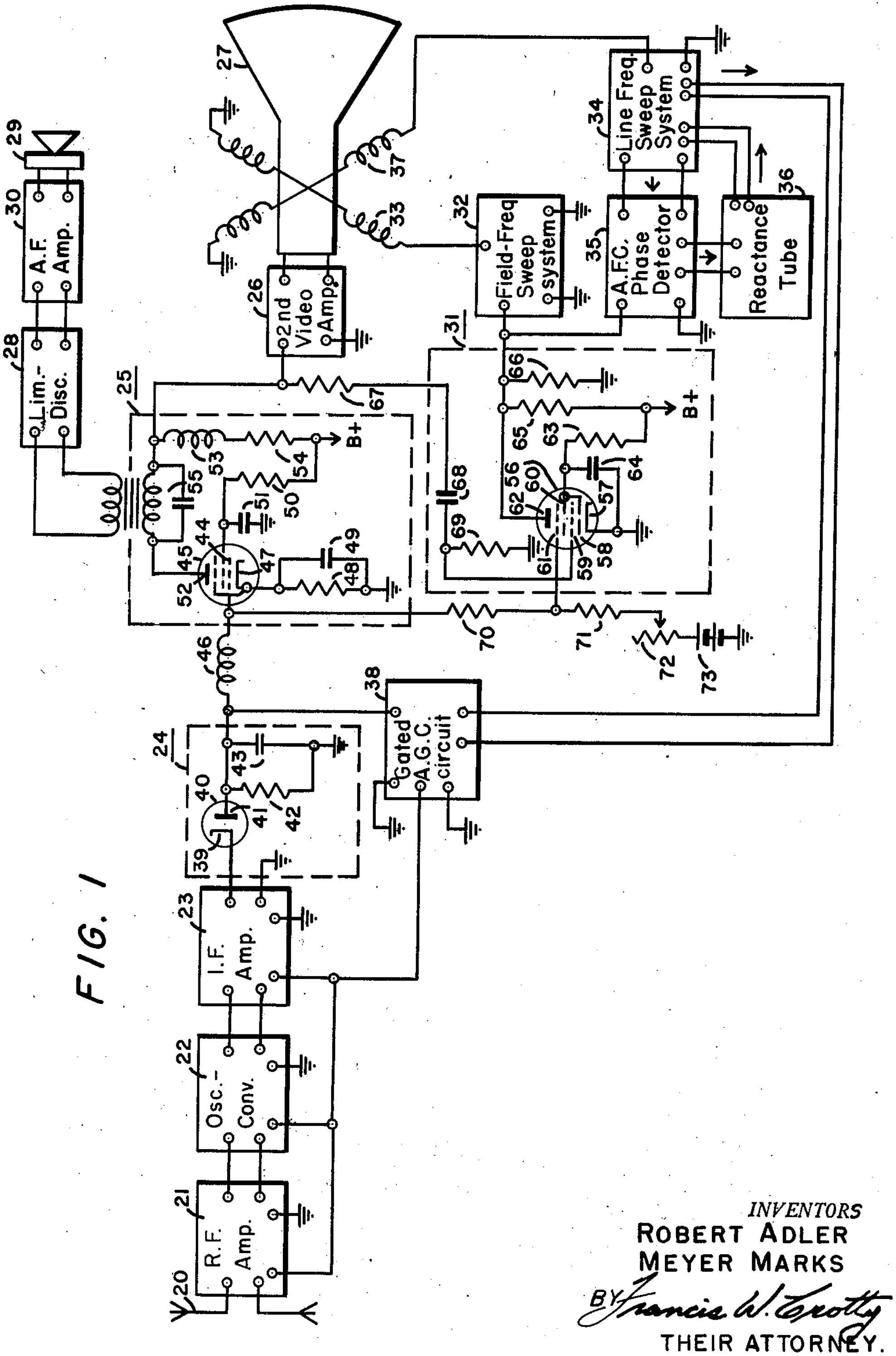
Figure 1 is a schematic diagram of a television receiver embodying the present invention.

In the television receiver of Figure 1, incoming composite television signals are intercepted by means of an antenna 20 and applied to a radio-frequency amplifier 21. The amplified composite television signals are converted in frequency by means of an oscillator-converter 22, and the resulting intermediate-frequency composite television signals are amplified by means of an intermediate-frequency amplifier 23. The amplified intermediate-frequency signals are impressed on a video detector 24, and the detected composite video signals are applied to a first video amplifier 25. After further amplification in a second video amplifier 26, the detected composite video signals are applied to the input circuit of a cathode-ray tube 27 or other suitable image-reproducing device.

Intercarrier sound signals are coupled from first video amplifier 25 to a limiter-discriminator 28, and the detected audio-frequency signals are applied to a loud-speaker 29 or other sound-reproducing device after amplification in an audio-frequency amplifier 30.

Detected composite video signals from first video amplifier 25 are also applied to a synchronizing-signal separator 31. Field-frequency synchronizing-signal pulses from separator 31 are employed to drive a field-frequency sweep system 32 which supplies suitable scanning current to an appropriate field-frequency deflection coil 33 associated with image-reproducing device 27. Line-frequency synchronizing-signal pulses from separator 31 are compared in phase with a locally generated line-frequency sweep-signal from a line-frequency sweep system 34 by means of an automatic-frequency-control (AFC) phase detector 35. The unidirectional control signal developed by AFC phase detector 35 is employed to control a reactance tube 36 which in turn controls the operating frequency of line-frequency sweep system 34. Sweep system 34 provides suitable scanning currents for line-frequency deflection coils 37 associated with image-reproducing device 27.

The receiver is also provided with a gated automatic gain control (AGC) system 38 which operates in response to detected composite video signals from video detector 24 and a line-frequency gating signal from line-frequency sweep system 34 to provide a suitable unidirectional gain-control potential which in turn is applied to one or more of the radio-frequency amplifier, oscillator-converter, and intermediate-frequency amplifier stages of the receiver.

The construction and operation of the receiver of Figure 1 may be entirely conventional with the exception of synchronizing-signal separator 31. Radio-frequency amplifier 21, intermediate-frequency amplifier 23 and audio-frequency amplifier 30 may each consist of one or more stages, and sweep systems 32 and 34 may include suitable output amplifier stages. The intercarrier sound system, gated AGC, and automatic frequency control of the line frequency sweep system are optional, though desirable, features, and additional refinements not shown may also be employed if desired. Video detector 24 and first video amplifier 25 are shown in detail only for the purpose of facilitating the explanation of the invention, and other known circuits may be substituted in their stead.

That part of the receiver of Figure 1 embodying the present invention, and specifically comprising video detector 24, first video amplifier 25, and synchronizing-signal separator 31, will now be described in more particular detail. The last intermediate-frequency amplifier is coupled to the cathode 39 of a diode 40, the anode 41 of which is coupled to ground through the parallel combination of a resistor 42 and a condenser 43. Anode 41 of diode 40 is also coupled to the control grid 44 of an electron-discharge device 45 by means of a peaking coil 46. The cathode 47 of device 45 is connected to ground through a biasing network comprising a resistor 48 and a shunt condenser 49. The screen grid of device 45 is connected to a suitable source of a positive unidirectional operating potential, conventionally designated B+, through a voltage-dropping resistor 50 and is by-passed to ground by means of a condenser 51. The suppressor grid of device 45 is directly connected to cathode 47, and the anode 52 is coupled to B+ through a peaking coil 53 and a load resistor 54. A parallel-resonant circuit 55 is connected between anode 52 and peaking coil 53 and is tuned to a frequency corresponding to the difference between the vido-signal carrier frequency and the sound-signal carrier frequency for deriving intercarrier sound signals which are applied to limiter-discriminator 28. The output signals developed across peaking coil 53 and load resistor 54 are coupled to second video amplifier 26.

Synchronizing-signal separator 31 comprises an electron-discharge device 56 of the gated-beam type comprising in the order named a cathode 57, a first accelerating electrode 58, a first control grid 59, a second accelerating electrode 60, a second control grid 61, and an anode 62. Cathode 57 is directly connected to ground, and accelerating electrodes 58 and 60 are connected together and to B+ through a voltage-dropping resistor 63. A by-pass condenser 64 is connected between accelerating electrodes 58 and 60 and ground. Anode 62 is coupled to B+ through a load resistor 65, and a stabilizing resistor 66 is connected between anode 62 and ground.

Amplified positive-polarity composite video signals appearing across the output load impedance of first video amplifier 25 are applied between first control grid 59 and cathode 57 of device 56 through resistor 67 and a self-biasing input circuit comprising a coupling condenser 68 and a grid resistor 69. Negative-polarity composite video signals from video detector 24 are applied between second control grid 61 and cathode 57 of device 56 by means of a network comprising resistors 70 and 71 and rheostat 72. A source of positive bias voltage, here shown as a battery 73, is included in the return circuit for second control grid 61. In practice, rheostat 72 may be returned directly to B+, the same source of positive unidirectional operating potential as is employed for providing the anode operating voltage for the several stages of the receiver.

In operation, video detector 24 develops negative-polarity composite video signals across resistor 42 and condenser 43. These negative-polarity composite video signals are amplified and inverted in phase by first video amplifier 25, and the amplified positive-polarity composite video signals so developed are again amplified and inverted in phase by means of second video amplifier 26, so that negative-polarity composite video signals are applied to the control grid of image-reproducing device 27.

If there were no signal applied to second control grid 61 of device 56, the operation of synchronizing-signal separator 31 would be substantially identical with that disclosed and claimed in the copending application of Erwin M. Roschke et al., Serial No. 94,642, filed May 21, 1949, for "Signal Slicing Circuits," now Patent No. 2,656,414, issued October 20, 1953, and assigned to the present assignee. Briefly, the unique operating characteristics of the gated-beam tube 56 cooperate with the external circuit elements to provide synchronizing-signal slicing or double clipping in a single stage. The gated-beam tube may be of the type disclosed and claimed in U. S. Patent 2,511,143 to Robert Adler, dated June 13, 1950, for "Electron Discharge Devices" and assigned to the present assignee. The anode-current versus control-grid-voltage characteristic of such a tube is of the step-function type, comprising two regions of substantially zero transconductance separated by a narrow region of high transconductance. Moreover, the control-grid-current versus control-grid-voltage characteristic also exhibits a saturation effect which enhances the operation of the system by limiting the magnitude of the negative bias voltage which may develop across condenser 68, in the manner described in detail in the above-identified copending Roschke et al. application. The output voltage developed across load impedance 65 comprises negative-polarity pulses in synchronism with the line- and field-synchronizing pulses and corresponding to an intermediate amplitude portion of those pulses, and resistor 66 operates to stabilize the average or D. C. level of the output pulses.

While a system of the type described in the above-identified Roschke et al. application affords numerous advantages, particularly improved noise rejection, with respect to other types of synchronizing-signal separators known to the art, its performance still leaves something to be desired under certain operating conditions. For example, during weak-signal reception subject to a large amount of extraneous impulse noise, the output pulses from the synchronizing-signal separator comprises a relatively large proportion of extraneous noise components. These components have some disrupting influence on the operation of the line-frequency sweep system, in spite of the effective noise rejection properties of the automatic frequency control circuit. The effects of extraneous noise components on the field-frequency scanning system are much more detrimental, however, since direct triggered synchronization is employed for field-frequency scanning. While stable operation may be achieved under most operating conditions, it has been found that field-frequency synchronization fails with increasing noise before the line-synchronizing and picture-signal information become so weak as to be unusuable. In other words, field-frequency synchronization is the critical factor under extreme conditions of weak-signal reception with heavy extraneous noise.

In accordance with the present invention, the disrupting influence of extraneous noise pulses on field-frequency synchronization under noisy weak-signal conditions is greatly alleviated and in practice effectively eliminated by gating out the synchronizing-signal separator for the duration of the undesired extraneous noise pulses. This is accomplished by effectively applying negative-polarity composite video signals from video detector 24, or alternatively from any other suitable part of the receiver as for example from second video amplifier 26, between second control grid 61 and cathode 57 of synchronizing-signal separator tube 56. In the embodiment of Figure 1, negative-polarity composite video signals from video detector 24 are direct-coupled to control grid 61 through resistor 70, although it is apparent that nearly equivalent performance may be obtained by applying positive-polarity composite video signals to an impedance connected between cathode 57 and ground. Second control grid 61 is positively biased to such an extent that all video-signal and synchronizing-signal components of the applied signal are impressed on that control grid within the region of anode current saturation, so that substantially no output-signal components representing picture and/or synchronizing information are developed in response to the signal applied to control grid 61. Resistor 71 is made much larger than series coupling resistor 70 to avoid grid-current loading of first video amplifier 25, and resistor 70 also limits the amount of current drawn by noise-gating grid 61, thereby resulting in a further effective compression of the video-signal and synchronizing-signal components at the noise-gating grid. Extraneous noise pulses, which in practice are of much greater amplitude than any video-signal or synchronizing-signal component, and which are of negative polarity at second control grid 61, drive grid 61 beyond anode current cut-off, so that no output signal is developed across load impedance 65 in the presence of an extraneous noise pulse.

In order to restrict the gating action to the actual duration of each individual extraneous noise pulse, the coupling means from the source of negative-polarity composite video signals to the auxiliary gating grid preferably consist of direct-current-conductive circuit elements; it is possible however to employ capacitance elements in the coupling network if all time constants are maintained at a high value with respect to the mean time interval between noise pulses so that each individual noise pulse has a negligible influence on the charge developed across the capacitive elements.

In summary then, positive-polarity composite video signals are supplied to the first control grid of gated-beam tube 56 through a self-biasing input circuit to provide synchronizing-signal slicing or double clipping. Extraneous noise-pulse components of the applied positive-polarity composite video signals are prevented from developing corresponding output signal components by applying a counterphased, or negative-polarity, composite video signal to a positive biased auxiliary gating grid of the separator tube. Since the signals applied to the two control grids are derived from the same signal channel and are in counterphase with respect to each other, the noise pulse components of the negative-polarity composite video signal drive the gating grid beyond cutoff at precisely the proper instants to prevent space current, passed by the first control grid in response to noise components of the applied positive-polarity input signal, from reaching the output electrode or anode. Video-signal and synchronizing-signal components of the negative-polarity composite video signal which is employed for gating are prevented from inducing output current components in opposition to the desired pulse output by positively biasing the gating grid so that only the noise pulse components reach the high transconductance portion of the step function characteristic. The net result is that the output signal developed by synchronizing-signal separator 31 represents either correct synchronizing information or no information at all, so that receiver synchronism is maintained even during reception of extremely weak signals subject to heavy extraneous noise impulses. In practice, field-frequency synchronization is maintained even during reception of such weak signals that the reproduced image is almost unintelligible. Indeed, the immunity to extraneous impulse noise is so complete that automatic frequency control need no longer be employed in the line-frequency sweep system, although other expedients may be required to suppress random noise generated in the receiver circuit and attributable to thermal agitation, shot effect and the like.

While the circuit of first video amplifier 25 has been illustrated and described as comprising a common load impedance from which the input signals to second video amplifier 26 and to the first control grid 59 of separator tube 56 are derived, it may be advantageous to derive these input signals from different points on the load impedance of first video amplifier 25. For example, a resistor and a condenser may be connected in parallel between parallel-resonant circuit 55 and peaking coil 53, and the input signals to first control grid 59 of separator tube 56 may be derived from the entire load impedance including peaking coil 53, load resistor 54, and the additional parallel-connected resistor and condenser. Such an arrangement provides increased gain for the synchronizing-signal components applied to synchronizing-signal separator 31; the accompanying reduced fidelity for the video-signal components is not detrimental since these components do not contribute to the output signal developed by synchronizing-signal separator 31. Such an arrangement is particularly disclosed in the above-identified Roschke et al. application. When a circuit of this type is employed, it is apparent that the positive-polarity composite video signals applied to the input grid 59 of separator tube 56 are not geometrically similar, in an amplitude sense, to the negative-polarity composite video signals developed by video detector 24 and applied to the noise-gating grid 61 of separator tube 56. Consequently, in the appended claims, "similar" composite video signals are to be construed as composite video signals wherein the synchronizing-signal components and the video-signal components represent the same synchronizing- and picture-information.

It is to be particularly noted that the greatly improved noise immunity afforded by the present invention is achieved at the cost of only a few inexpensive impedance elements, preferably simple resistors. There are noise rejection systems known to the art which are capable of providing noise immunity comparable to that afforded by the present invention, but such systems require an additional rectifier or other non-linear circuit element for separating the extraneous noise pulses from the desired signal; the thus-separated noise pulses are then employed as a gating signal. The need for such expensive circuit components is avoided by the system of the present invention in which the operating characteristics of the separator tube itself are employed, not to separate the noise pulses from the signal information, but to suppress the effect on the output signal of the video-signal and synchronizing-signal components applied to the gating grid.

While the system shown and described in connection with Figure 1 provides greatly improved noise immunity, it is still subject to one technical difficulty under certain extreme operating conditions. In spite of the fact that the gated-beam tube exhibits a grid current saturation effect, the negative bias developed by the self-biasing input circuit associated with the first control grid 59 may be increased, by grid current drawn during noise pulse intervals, to a sufficient extent to bias the tube beyond cutoff for several ensuing synchronizing-pulse intervals, particularly under weak-signal conditions. In practice, this may result in temporary loss of synchronization, particularly in the field-frequency scanning system. A system in which this disadvantage is effectively overcome is schematically illustrated in Figure 2.

Figure 2:
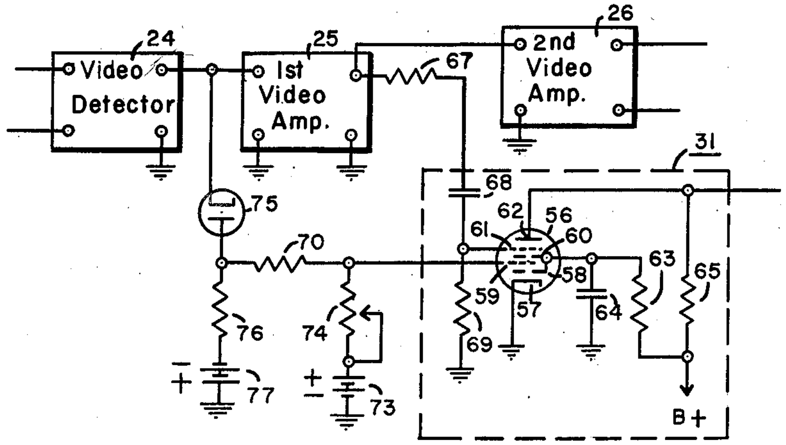
Figures 2 and 3 are schematic diagrams of other embodiments of the invenion.

In Figure 2, the negative-polarity composite video signals from video detector 24 are impressed across the series combination of a unilaterally conductive device, such as a doide 75, a load resistor 76, and a suitable source of unidirectional negative biasing potential, here shown as a battery 77. Unilaterally conductive device 75 is connected with such polarity as to be conductive only in the presence of signal components which are of greater negative amplitude than the biasing voltage of battery 77. In other words, device 75 is an amplitude-delay-biased unilaterally conductive device, and the voltage of battery 77 is so adjusted as to permit device 75 to be conductive only in the presence of extraneous noise impulses whose amplitude exceeds the peak amplitude of the synchronizing-pulse components of the impressed negative-polarity composite video signals. The separated noise pulses are direct-coupled to the first control grid 59 of gated-beam tube 56 which serves as the synchronizing-signal separator tube. Positive-polarity composite video signals from first video amplifier 25 are applied through a self-biasing input circuit to second control grid 61. Stabilizing resistor 66 has been emitted since this circuit element merely constitutes a refinement of the system and is not essential to its operability. In all other respects, the circuit of Figure 2 is substantially identical with the corresponding portion of the receiver of Figure 1.

In operation, extraneous noise pulses are separated and applied to the first control grid 59 of separator tube 56 as a noise-gating signal, while the positive-polarity composite video signals, from which the output synchronizing pulses are developed, are applied to the second control grid 61. As a consequence, noise pulses are prevented from materially affecting the bias of the signal-input grid 61, since space current is prevented from reaching the input grid during noise pulse intervals by the gating action of the first control grid 59. Therefore, temporary loss of synchronization or tearing out which might otherwise be caused by the self-biasing action of the signal input circuit is effectively avoided.

Figure 3:
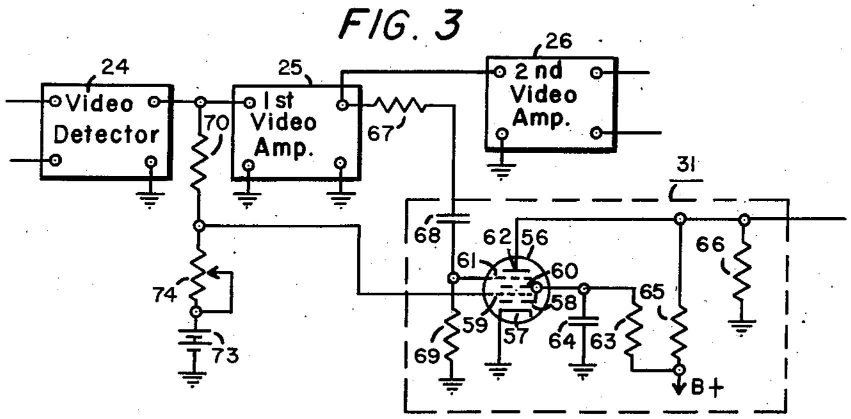

A system combining the advantages of the arrangements of Figures 1 and 2—in which noise immunity is achieved without the use of auxiliary diodes or electron-discharge devices and without permitting excessive negative bias to be built up on the signal-input grid in the presence of noise pulses—is schematically illustrated in Figure 3.

In the arrangement of Figure 3, which constitutes the preferred embodiment of the invention, synchronizing-signal separator 31 is substantially identical with that shown in the receiver of Figure 1 with the exception that the input circuits associated with the two control grids 59 and 61 of the separator tube 56 are interchanged. The positive-polarity composite video signals from first video amplifier 25 are applied through a self-biasing input circuit between second control grid 61 and cathode 57, while the negative-polarity composite video signals from video detector 24 are direct-coupled between first control grid 59 and cathode 57. A suitable positive bias voltage is applied to first control grid 59 from battery 73 through a rheostat 74. A mechanical stop may be provided to obtain a bias-supply circuit which is the full equivalent of a fixed resistor and a rheostat in series as shown in Figure 1.

The arrangement of Figure 3 possesses all of the advantages of the system of Figure 1, in addition to which large-amplitude noise pulses are prevented from increasing the negative bias developed at the signal-input grid 61 by the positive-polarity input signal. This objective is achieved by virtue of the fact that positive-polarity noise pulses applied to control grid 61 are prevented from causing grid current to flow in the self-biasing input circuit because the negative-polarity noise pulses simultaneously applied to first control grid 59 interrupt the space current during noise-pulse intervals. It is therefore immaterial that the signal-input grid 61 may be driven sharply positive by the incoming noise pulses, since the space current is blocked from the signal-input grid by virtue of the gating action. Consequently, loss of synchronization or tearing out is avoided.

Figures 4, 7:
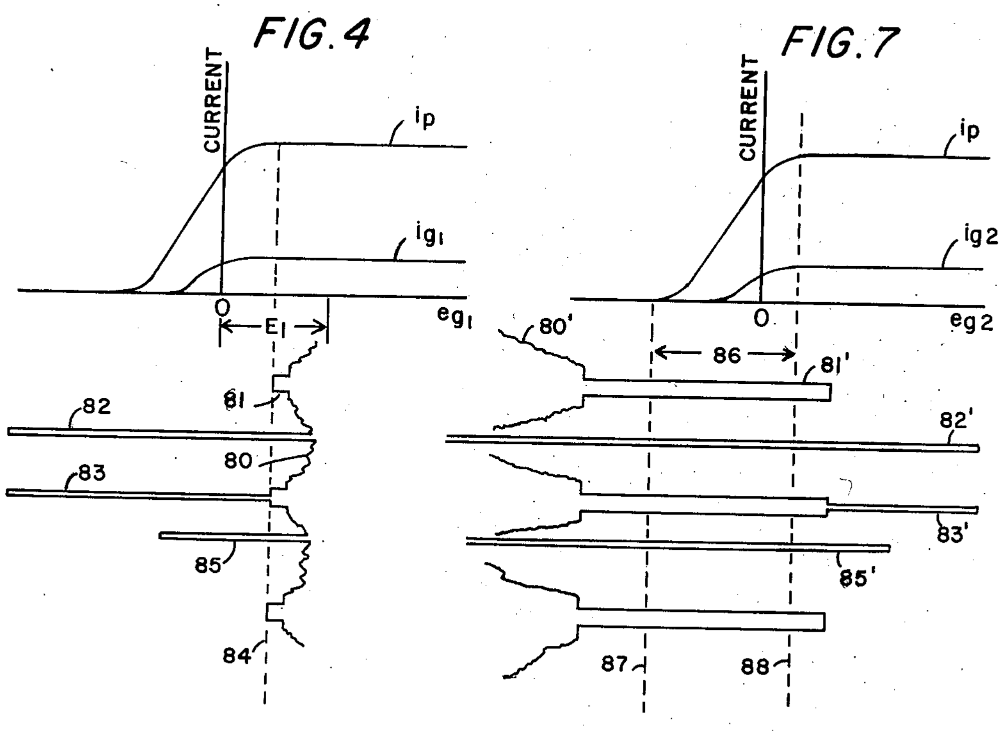
Figures 4–8 are graphical representations useful in understanding the operation of the invention.

Figures 4–8 are idealized graphical representations of certain operating characteristics which are useful to facilitate an understanding of the operation of the circuit of Figure 3. In Figure 4, the anode current $i_p$ and the gating-grid current $i_{g1}$ are plotted as functions of the voltage $e_{g1}$ applied to the first control grid or gating grid 59, the second control grid 61 being maintained at a suitable constant voltage to permit space current to pass unimpeded to the output electrode or anode 62. The anode current characteristic $i_p$ is of the step-function type, so that the first control grid has a high transconductance throughout a narrow range of grid voltages between anode-current cutoff and anode-current saturation. First control grid 59 is positively biased by an amount $E_1$ such that all video-signal components 80 and synchronizing-signal components 81 of the applied negative-polarity composite video signal are impressed on the first control grid 59 at voltages within the range of plate-current saturation, with the result that these components of the signal applied to the first control grid have no effect on the output current. However, extraneous noise impulses, which may occur either during video-signal intervals such as pulse 82 or during synchronizing-pulse intervals such as pulse 83, are of much larger amplitude than any component of the desired composite video signal. These noise pulses extend across the high-transconductance portion of the step-function operating characteristic into the region of plate-current cutoff, so that the flow of space current to the output electrode is instantaneously interrupted for the duration of each noise pulse. Consequently, no space current is permitted to flow to the output electrode during noise-pulse intervals, regardless of the potential of the second control grid 61. By adjusting the amount of positive bias voltage $E_1$ applied to first control grid 59 so that the peak value of the synchronizing pulses 81 substantially corresponds to the knee of plate-current saturation of the step-function operating characteristic, as indicated by the dotted vertical line 84, it may be assured that even noise pulses of relatively small amplitude, such as pulse 85, result in a substantial reduction in the maximum space current which is permitted to flow to output electrode or anode 62.

Figure 5:
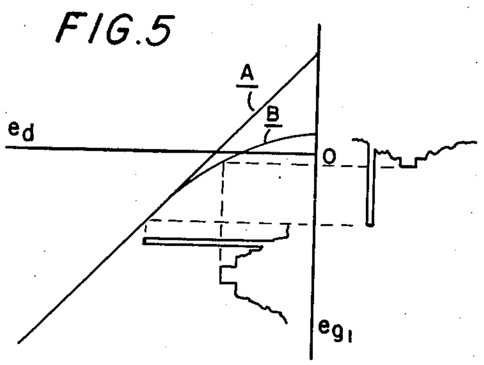

The effective compression of the video-signal components and the synchronizing-pulse components of the composite video signal at the first control grid 59 is further enhanced by virtue of the grid-current characteristic of the gated-beam tube. Thus, by virtue of the fact that first control grid 59 is positively biased, picture-signal and synchronizing-signal components of the composite video signal result in a flow of grid current from cathode 57 to the first control grid 59 which reduces the effective voltage $e_{g1}$ applied between control grid 59 and cathode 57. This grid-current loading effect is illustrated in Figure 5, in which the voltage $e_d$ developed by the video detector is plotted as abscissa and the effective voltage $e_{g1}$ between first control grid 59 and cathode 57 is plotted as ordinate. Curve A illustrates the relationship between these two voltages which would exist in the absence of grid-current loading, while curve B represents the actual characteristic in the presence of grid-curent loading.

Figure 6:
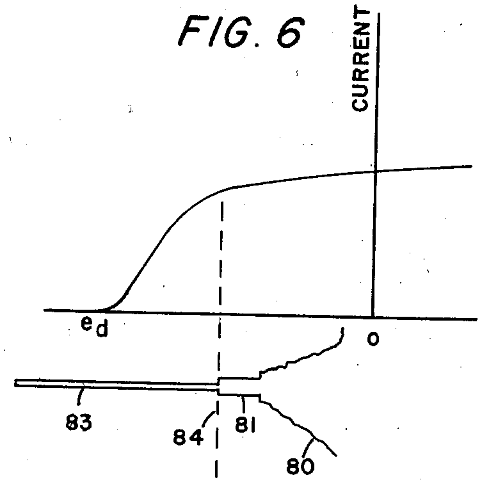

From the curves of Figure 5, it is apparent that the smaller-amplitude portions of the output signal from video detector 24, corresponding to video-signal and synchronizing-signal components, are compressed by an amount corresponding to the spacing between the two curves A and B while the larger-amplitude components of the video detector output signal, corresponding to extraneous noise impulses, are substantially linearly translated to the first control grid 59. The effect of grid-current loading and the accompanying effective compression of the video-signal and synchronizing-signal components is to sharpen the knee of the effective plate-current saturation characteristic of the overall system from the output of video detector 24 to first control grid 59. This effect is illustrated in Figure 6, in which the output curernt $i_p$ is plotted as a function of voltage $e_d$ developed by video detector. By comparison with the plate-current characteristic of the tube shown in Figure 4, it is apparent that the knee of plate-current saturation is rendered sharper by the grid-current loading effect and is displaced to the left by virtue of the positive bias applied to the first control grid. The stepper step thus obtained permits sharper discrimination between extraneous noise impulses and synchronizing-signal pulse components of the composite video signal.

The control characteristics of the second control grid 61 of separator tube 56 are plotted in Figure 7, in which the output current $i_p$ and the second-grid current $i_{g2}$ are plotted as functions of the voltage $e_{g2}$ applied to the second control grid, the potential of the first control grid 59 being maintained constant at a value in the plate-current saturation region of its operating characteristic. The $i_p$ versus $e_{g2}$ characteristic is also of the step-function type, comprising two regions of substantially zero transconductance separated by a narrow region of high transconductance. The $i_{g2}$ versus $e_{g2}$ characteristic exhibits a grid-current saturation effect. In the absence of a gating signal on the first control grid 59, the operation of the system is substantially identical with that set forth in the above-identified copending Roschke et al. application. The positive-polarity composite video signal from first video amplifier 25 is similar to the negative-polarity composite video signal applied to the noise-gating grid and is in counterphase therewith as indicated by the application of corresponding primed references in Figure 7. The output signal represents an intermediate amplitude-portion, corresponding to the portion between anode current cutoff 87 and anode current saturation 88, of the incoming positive-polarity synchronizing-signal pulse components of the composite video signal. Since the second control grid is self-biased, and because the second control grid has a low conductance (represented by the slope of the $i_{g2}$ characteristic) for all values of input signal voltage, double clipping is effected between anode-current cutoff and anode-current saturation. However, in the absence of the gating arrangement associated with the first control grid, extraneous noise impulses occurring during video-signal intervals are also translated to the output circuit.

Figure 8:
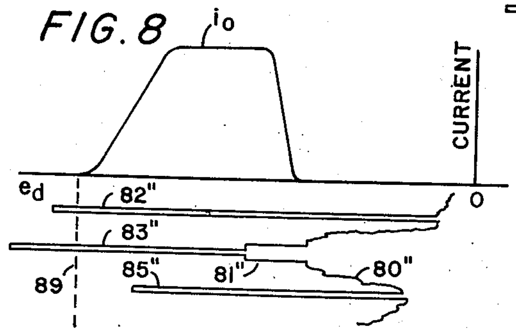

With the gating signal applied to the first control grid as in the system of Figure 3, large-amplitude extraneous noise pulses instantaneously interrupt the flow of space current to the output electrode or anode. This noise-gating action effectively changes the operating characteristic of the separator tube as indicated by the curve of Figure 8, which represents the output current $i_o$ as a function of the output voltage $e_d$ from the video detector. From this composite operating characteristic, it is apparent that no output current components are obtained corresponding to large-amplitude extraneous noise pulses 82″ and 83″ traversing the effective anode-current cutoff 89 attributable to the noise-gating action of the first control grid. Moreover, a smaller-amplitude noise pulse such as that indicated at 85″ produces only a very small-amplitude output pulse component.

In all of the systems thus far shown and described, a gated-beam tube has been employed as the electron-discharge device of the synchronizing-signal separator 31. In accordance with a further embodiment of the invention, it is possible to obtain comparable advantages by employing other types of electron-discharge device. For example, in the arrangement of Figure 9, a conventional pentagrid converter tube 90 is employed as the synchronizing-signal separator tube. Device 90 may comprise in the order named a cathode 91, a first control grid 92, a first screen grid or accelerating electrode 93, a second control grid 94, and an anode 95, while a second screen grid or accelerating electrode 96 and a suppressor grid 97 may be included between second control grid 94 and anode 95. Cathode 91 is directly connected to ground, and screen grids 93 and 96 are connected together and to B+ through voltage-dropping resistor 63. Suppressor grid 97 is connected to cathode 91, and anode 95 is coupled to B+ through load resistor 65. Second control grid 94 serves as the signal-input grid, while first control grid 92 is employed as the noise-gating grid.

Figure 9:
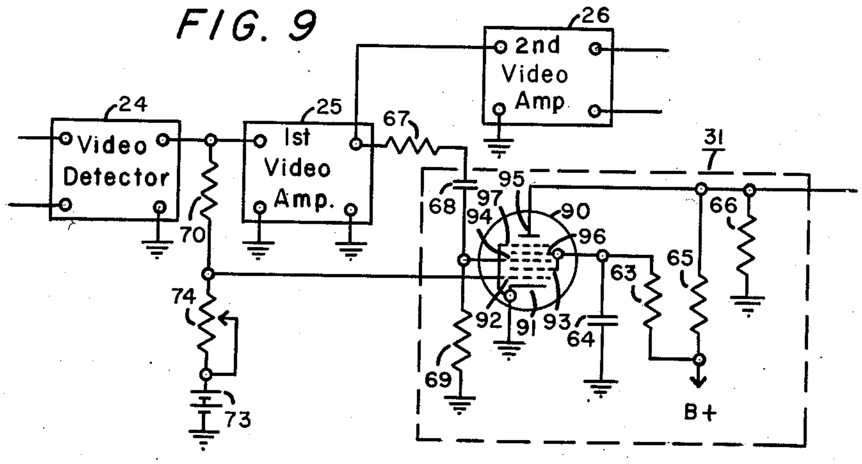
Figure 9 is a schematic diagram of a further embodiment of the invention.

In its broader aspects, the system of Figure 9 functions in substantially the same manner as that of Figure 3. Positive-polarity composite video signals are impressed between second control grid 94 and cathode 91 by means of a self-biasing input circuit in such a manner that intermediate amplitude-portions of the synchronizing-signal pulse components are translated to the output circuit. To provide greatly improved noise immunity, negative-polarity composite video signals from video detector 24 are applied between first control grid 92 and cathode 91. Extraneous noise impulses of large amplitude which may be present in the detected composite video signal interrupt the flow of space current to output electrode or anode 95 in substantially the same manner as in the embodiment of Figure 3; since the noise gating is achieved by means of a grid located between cathode 91 and signal-input grid 94, coupling condenser 68 is prevented from acquiring any additional negative charge in the presence of large-amplitude positive-polarity noise pulses at the input grid.

Figure 10:
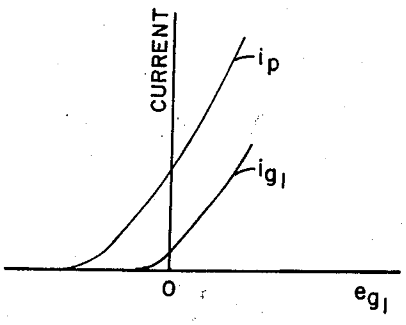
Figures 10–13 are graphical representations of operating characteristics of the circuit of Figure 9.
Figure 11:
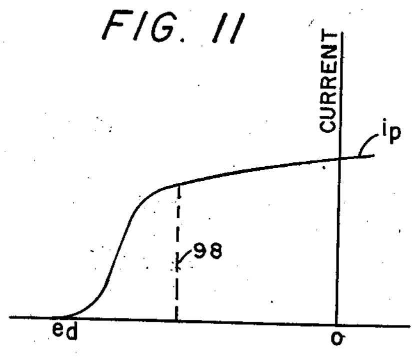

The operation of the embodiment of Figure 9 differs from that of the arrangement of Figure 3, however, in the mechanism by which effective compression of the video-signal and synchronizing-signal components is achieved at the noise-gating grid. Since the first control grid 92 of a conventional pentagrid converter tube is directly adjacent the cathode, with no preceding positive electrode, its anode current $i_p$ versus control grid voltage $e_{g1}$ characteristic is not of the step-function type but more closely resembles the anode operating characteristic of an ordinary triode, as shown in Figure 10. Moreover, the grid current $i_{g1}$ versus grid voltage $e_{g1}$ characteristic of first control grid 92 does not exhibit a saturation effect but rises with increasing grid voltage in the manner shown in Figure 10; in other words, the conductance of first control grid 92 increases with positively increasing input voltage. As a consequence, there is no compression of the video-signal and synchronizing-signal components attributable to plate-current saturation. However, by virtue of the positive bias voltage impressed on first control grid 92 by means of battery 73, grid current is drawn by first control grid 92 in the presence of video-signal and synchronizing-signal components, and this grid current is limited by means of resistor 70; on the other hand, no grid current is drawn in the presence of extraneous negative-polarity noise pulses. The effective overall operating characteristic thus obtained is graphically represented in Figure 11 in which the output current $i_p$ from synchronizing-signal separator 31 is plotted as a function of the output voltage $e_d$ from video detector 24. The positive bias applied to first control grid 92 is adjusted by means of rheostat 74 to such a value that the negative-polarity synchronizing-pulse peaks are impressed on the characteristic of Figure 11 at or slightly above the knee of the curve represented by dotted line 98. It is then apparent that the video-signal and synchronizing-signal components are effectively suppressed, while the larger-amplitude extraneous noise pulses drive first control grid 92 beyond anode-current cutoff.

Figure 12:
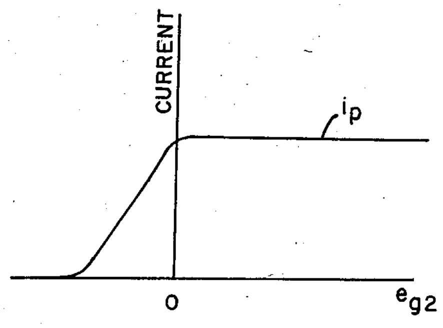
Figure 13:
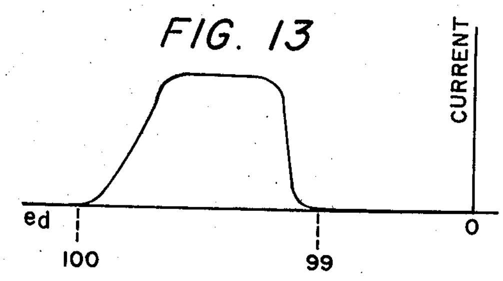

The anode operating characteristic of second control grid 94 is qualitatively similar to that of the second control grid of the gated-beam tube, since the second control grid is preceded by a positive electrode. This operating characteristic, in the absence of a gating voltage at the first grid, is illustrated in Figure 12 in which the output current $i_p$ is plotted as a function of the voltage $e_{g2}$ applied to the second control grid 94. The effect of applying the noise-gating negative-polarity composite video signals to the first control grid 92 is to provide an overall operating characteristic of the type shown in Figure 13, in which the output current $i_o$ is plotted as a function of the output voltage $e_d$ from the video detector. It is apparent from a consideration of the curve of Figure 13 that only those portions of the input signal applied to second control grid 94 which lie between the two anode-current cutoffs 99 and 100 are translated to the output circuit. The overall $i_o$ versus $e_d$ characteristic obtained with a conventional pentagrid converter tube, as represented in Figure 13, is therefore quite similar to that obtained with a gated-beam tube as shown in Figure 8.

While the systems thus far shown and described achieve the objectives of greatly improved noise immunity at nominal cost, there is an additional problem which may arise when systems of this type are incorporated in a television receiver employing gated automatic gain control. In a gated automatic gain control system, the AGC control potential is derived from the synchronizing-pulse components of the composite video signal. Conventionally, the composite video signal is applied to an AGC detector which is rendered operative only during synchronizing pulse intervals by means of a gating signal derived from the line-frequency sweep system. When a noise-immune synchronizing-signal separator of the type described above is employed in a receiver comprising a gated AGC system, receiver channel switching may result in paralysis of the AGC system and permanent loss of synchronism under certain operating conditions.

More specifically, if a channel-switching operation is performed at the receiver, the AGC system is instantaneously rendered inoperative, and all of the amplifier stages of the receiver are conditioned for operation at full gain. If the signal received from the newly-selected channel is a strong signal, the detected composite video signal from the output of video detector 24 may be of sufficient amplitude to cut off separator tube 56 during synchronizing-pulse intervals, even in the absence of extraneous noise pulses. The AGC system may therefore be paralyzed indefinitely, since the gating voltage for the AGC detector is conventionally derived from the line-frequency sweep system which follows synchronizing-signal separator 31. As a result, the operation of the line-frequency and field-frequency scanning systems is divorced from the incoming synchronizing pulses.

Figure 14:
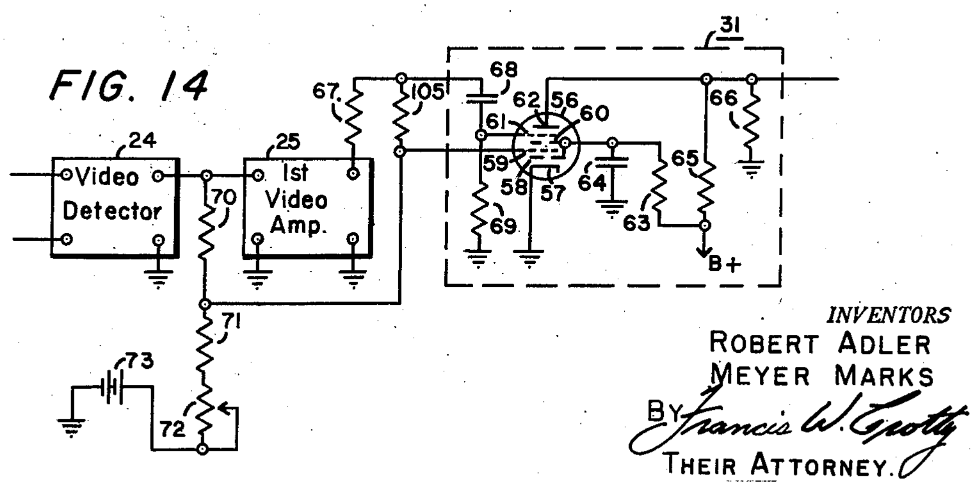
Figure 14 is a schematic diagram of still another embodiment of the invention.

In the embodiment of Figure 14, provision is made to preclude paralysis of the AGC system and the resulting loss of synchronization. The system of Figure 14 is substantially identical with that of Figure 3 with the exception that a resistor 105 is added between the output of first video amplifier 25 and the noise-gating grid 59 of separator tube 56.

The manner in which the addition of resistor 105 precludes paralysis of the receiver may be explained on either of two bases. In a more elementary sense, resistor 105 may be viewed as providing a direct-current feedback path to modify the bias of noise-gating grid 59 during the channel-switching operation. Under the conditions previously mentioned, the signal amplitude at noise-gating grid 59 of separator tube 56 may be so great as to interrupt the space current to output electrode 62 even in the absence of extraneous noise pulses. At the same time, however, the negative-polarity synchronizing-signal pulses are also of sufficient amplitude to drive first video amplifier 25 beyond plate-current cutoff, so that the average potential at the output of first video amplifier 25 rises during the synchronizing-pulse intervals. By providing a conductive coupling, such as by resistor 105, between the output of first video amplifier 25 and noise-gating grid 59 of separator tube 56, the positive bias of the noise-gating grid during synchronizing-pulse intervals is therefore increased. Resistor 105 is selected to increase the positive bias of gating grid 59 by an amount sufficient to permit the flow of space current to output electrode 62 during synchronizing-pulse intervals. Once the output from synchronizing-signal separator 31 is re-established in this manner, the gating voltage for the AGC detector from the line-frequency sweep system is again maintained in proper phase relation with respect to the incoming synchronizing pulses, and normal automatic gain control action is restored. The signal level at the output of the video detector is then reduced to its normal value, first video amplifier 25 is no longer cut off by the synchronizing-pulse components of the composite video signal, and the average potential at the output of first video amplifier 25 is reduced so that the normal bias of gating grid 59 is restored.

The system of Figure 14 may be viewed in another manner. Resistor 105 may be so proportioned with respect to resistor 70 that the positive-polarity video-signal and synchronizing-pulse components applied to gating grid 59 through first video amplifier 25 effectively balance the corresponding components of the negative-polarity composite video signals which are direct-coupled to gating grid 59 from video detector 24. There is no such balancing action with respect to the noise impulses, however, because noise impulses drive first video amplifier 25 beyond cutoff with the result that no positive-polarity noise pulses are translated through resistor 105 to the noise-gating grid. Consequently, the negative-polarity noise pulses from video detector 24 still perform the gating function in synchronizing-signal separator 31. The plate-current saturation and grid-loading effects are therefore no longer relied on to compress the video-signal and synchronizing-pulse components at the noise-gating grid. Clearly, equivalent performance may be obtained at added cost by employing an auxiliary amplifier, separate from the first video amplifier, for effecting the desired balancing action.

While the noise-gating grid has been described as positively biased with respect to the cathode in each of the disclosed embodiments, it is possible under some conditions to obtain good results by employing a slightly negative bias not exceeding the contact potential difference between the cathode and the noise-gating grid. This is so because the composite video signal at the noise-gating grid is greatly attenuated as long as grid current flows, so that the region of negative grid potential through which grid current is maintained—usually extending to about minus one volt—may be large enough to accommodate the video-signal and synchronizing-signal components of the applied negative-polarity composite video signal. Therefore, the polarity of the bias voltage applied to the noise-gating grid, for the purposes of the specification and the appended claims, is determined with respect to the potential at which grid current commences to flow, and not necessarily with respect to cathode potential.

Merely by way of illustration and in no sense by way of limitation, the following circuit component values may be employed in the preferred forms of synchronizing-signal separator 31 illustrated in Figures 3 and 9;

*Figure 3*

| | | |
|---|---|---|
| Electron-discharge device **56** | | Type 6BN6 |
| Resistor **63** | ohms | 47,000 |
| Resistor **65** | do | 47,000 |
| Resistor **66** | do | 120,000 |
| Resistor **67** | do | 10,000 |
| Resistor **69** | megohms | 3.3 |
| Resistor **70** | ohms | 40,000 |
| Mean resistance of rheostat **74** | megohms | 3.3 |
| Condenser **64** | microfarads | .004 |
| Condenser **68** | do | .01 |
| Battery **73** and B+ | volts | +150 |

*Figure 9*

| | | |
|---|---|---|
| Electron-discharge device **90** | | Type 6BE6 |
| Resistor **63** | ohms | 39,000 |
| Resistor **65** | do | 470,000 |
| Resistor **66** | do | 100,000 |
| Resistor **67** | do | 10,000 |
| Resistor **69** | megohms | 1.5 |
| Resistor **70** | ohms | 47,000 |
| Mean resistance of rheostat **74** | megohms | 3.3 |
| Condenser **64** | microfarads | 0.15 |
| Condenser **68** | do | 0.01 |
| Battery **73** and B+ | volts | +160 |

Thus the present invention provides a new and improved synchronizing-signal separator in which greatly improved noise immunity is achieved at nominal cost. In the system of the invention, extraneous noise impulses are substantially completely suppressed from the output of the synchronizing-signal separator, with the result that false synchronization is effectively precluded and satisfactory image reproduction is assured even under the most adverse impulse-noise conditions for which the received video-signal components remain intelligible.

While particular embodiments of the present invention have been shown and described, it is apparent that various changes and modifications may be made, and it is therefore contemplated in the appended claims to cover all such changes and modifications as fall within the true spirit and scope of the invention.

We claim:

1. In a television receiver, in combination: a source of composite video signals including video components of varying amplitude within a range below a predetermined threshold, and synchronizing-signal components of an amplitude exceeding said predetermined threshold, said composite video signals being subject to extraneous noise impulses of greater amplitude than said synchronizing-signal components; an electron-discharge device comprising, in the order named, a cathode, a first control grid, a second control grid, and an anode; means coupled to said source for applying said composite video signals, with the synchronizing-signal components positively oriented relative to the video components, to one of said control grids; means for biasing said one control grid to pass electron flow to said anode in response only to applied signal components of an amplitude exceeding said predetermined threshold; means for interrupting said electron flow in response to said extraneous noise impulses comprising means also coupled to said source and including a series resistor for simultaneously applying said composite video signals, with the synchronizing-signal components negatively oriented relative to the video components, to the other of said control grids and further comprising means returning said other control grid to a source of potential positive with respect to said cathode to bias said other control grid to maintain substantial grid current flow in the presence of said applied video and synchronizing-signal components; and an output circuit coupled to said anode; whereby an output signal substantially corresponding to said synchronizing-signal components and excluding said extraneous noise impulses is developed in said output circuit.

2. In a television receiver, in combination: a source of composite video signals including video components of varying amplitude within a range below a predetermined threshold and synchronizing-signal components of an amplitude exceeding said predetermined threshold, said composite video signals being subject to extraneous noise impulses of greater amplitude than said synchronizing-signal components; an electron-discharge device comprising, in the order named, a cathode, first and second control grids, and an anode; means including an accelerating electrode preceding one of said control grids for establishing a step-function operating characteristic for said one control grid; means coupled to said source for applying said composite video signals, with the synchronizing-signal components positively oriented relative to the video components, to the other of said control grids; means for biasing said other control grid to pass electron flow to said anode in response only to applied signal components of an amplitude exceeding said predetermined threshold; means for interrupting said electron flow in response to said extraneous noise impulses comprising means also coupled to said source for simultaneously applying said composite video signals, with the synchronizing-signal components negatively oriented relative to the video components, to said one control grid and further comprising means returning said one control grid to a source of potential positive with respect to said cathode to bias said one control grid to maintain substantial grid current flow in the presence of said applied video and synchronizing-signal components; and an output circuit coupled to said anode; whereby an output signal substantially corresponding to said synchronizing-signal components and excluding said extraneous noise impulses is developed in said output circuit.

3. In a television receiver, in combination: an electron-discharge device comprising, in the order named, a cathode, first and second control grids, and an anode; means including an accelerating electrode intermediate said control grids for establishing a virtual cathode in the vicinity of said second control grid; a self-biasing input circuit coupled between said second control grid and said cathode and including a series coupling condenser and a grid return resistor; means for applying to said input circuit composite video signals with the synchronizing-signal components positively oriented relative to the video components at said second control grid, said composite video signals being subject to extraneous noise impulses of greater magnitude than said synchronizing-signal components and positively oriented relative thereto tending to charge up said coupling condenser and increase the bias of said second control grid thereby rendering said electron-discharge device unresponsive to succeeding synchronizing-signal components; an output circuit coupled to said anode; means including a series resistor for returning said first control grid to a source of potential positive relative to said cathode; and means for applying said composite video signals, including said extraneous noise impulses, to said first control grid in time synchronism and phase opposition with said positively oriented composite video signals applied to said second grid to interrupt, in response to said extraneous noise impulses, electron flow in said device and prevent said charge-up of said coupling condenser; whereby an output signal substantially corresponding to said synchronizing-signal components and excluding said extraneous noise impulses is developed in said output circuit.

4. In a television receiver, in combination: an electron-discharge device comprising, in the order named, a cathode, first and second control grids, and an anode; a self-biasing input circuit coupled between said second control grid and said cathode and including a series coupling condenser and a grid return resistor; means for applying to said input circuit composite video signals with the synchronizing-signal components positively oriented relative to the video components at said second control grid, said composite video signals being subject to extraneous noise impulses, of greater magnitude than said synchronizing-signal components and positively oriented relative thereto, tending to charge up said coupling condenser and increase the bias of said second control grid thereby rendering said electron-discharge device unresponsive to suceceding synchronizing-signal components; an output circuit coupled to said anode; and means including a noise clipping device for separating said noise impulses from said video and synchronizing-signal components, for applying said extraneous noise impulses to said first control grid in time synchronism and phase opposition with said positively oriented noise impulses applied to said second grid to interrupt electron flow in said device and prevent said charge-up of said coupling condenser; whereby an output signal substantially corresponding to said synchronizing-signal components and excluding said extraneous noise impulses is developed in said output circuit.

5. In a television receiver for utilizing a received composite television signal, in combination: a video detector responsive to said composite television signal for developing a detected composite video signal including video components of varying amplitude within a range below a predetermined threshold and synchronizing-signal components of an amplitude exceeding said predetermined threshold with the synchronizing-signal components negatively oriented relative to the video components, said composite video signal being subject to extraneous noise impulses of greater amplitude than said synchronizing components; a phase-inverting video amplifier coupled to said video detector for developing a phase-inverted composite video signal; an electron-discharge device comprising a cathode, first and second control grids, and an anode; means including an accelerating electrode intermediate said control grids for establishing a virtual cathode in the vicinity of said second control grid; an output circuit coupled to said anode; means including a self-biasing input circuit coupled to said video amplifier for applying said phase-inverted composite video signal to said second control grid to pass electron current to said anode in response only to signal components of an amplitude exceeding said predetermined threshold, said noise impulses tending to overbias said second control grid and render said electron-discharge device unresponsive to a succeeding synchronizing-signal component; means coupling said video detector to said first control grid for applying said detected composite video signal to said first control grid; and means including a resistance connecting said first control grid to a source of potential positive with respect to said cathode for biasing said first control grid to permit full electron flow through said first control grid in response to said video and synchronizing-signal components but to inhibit such electron flow in response to the applied extraneous noise impulses; whereby said overbias of said second control grid is prevented and an output signal corersponding only to said synchronizing-signal components is developed in said output circuit.

References Cited in the file of this patent

UNITED STATES PATENTS

| | | |
|---|---|---|
| 2,224,134 | Blumlein | Dec. 10, 1940 |
| 2,227,056 | Blumlein et al. | Dec. 31, 1940 |
| 2,266,154 | Blumlein | Dec. 16, 1941 |
| 2,299,333 | Martinelli | Oct. 20, 1942 |
| 2,307,375 | Blumlein et al. | Jan. 5, 1943 |
| 2,493,353 | Kuperus | Jan. 3, 1950 |
| 2,509,975 | Janssen | May 30, 1950 |
| 2,539,374 | Pourciau | Jan. 23, 1951 |
| 2,632,049 | Druz | Mar. 17, 1953 |
| 2,632,802 | Vilkomerson et al. | Mar. 24, 1953 |

FOREIGN PATENTS

| | | |
|---|---|---|
| 497,371 | Great Britain | Dec. 19, 1938 |
| 845,897 | France | Sept. 4, 1939 |